US00RE50212E

(19) United States
(12) Reissued Patent
Fitzpatrick et al.

(10) Patent Number: US RE50,212 E
(45) Date of Reissued Patent: Nov. 19, 2024

(54) AMMUNITION MAGAZINE

(71) Applicant: Magpul Industries Corp., Austin, TX (US)

(72) Inventors: Richard M. Fitzpatrick, West Lake Hills, TX (US); Michael T. Mayberry, Denver, CO (US); Brian L. Nakayama, Arvada, CO (US); Eric C. Burt, Broomfield, CO (US)

(73) Assignee: Magpul Industries Corp., Austin, TX (US)

(21) Appl. No.: 17/459,617

(22) Filed: Aug. 27, 2021

Related U.S. Patent Documents

Reissue of:

(64) Patent No.: 10,393,457
Issued: Aug. 27, 2019
Appl. No.: 16/100,460
Filed: Aug. 10, 2018

U.S. Applications:

(63) Continuation of application No. 15/661,620, filed on Jul. 27, 2017, now Pat. No. 10,072,903, which is a (Continued)

(51) Int. Cl.
*F41A 9/67* (2006.01)
*F41A 9/62* (2006.01)

(Continued)

(52) U.S. Cl.
CPC ..... *F41A 9/70* (2013.01); *F41A 9/62* (2013.01); *F41A 9/65* (2013.01); *F41A 9/67* (2013.01); *F41A 9/69* (2013.01); *F41A 9/83* (2013.01)

(58) Field of Classification Search
CPC combination set(s) only.
See application file for complete search history.

(56) References Cited

U.S. PATENT DOCUMENTS 1,323,063 A 11/1919 Johnson et al.
3,395,479 A 8/1968 Collins (Continued)

FOREIGN PATENT DOCUMENTS

DE 654386 C 12/1937
DE 1094155 B 12/1960

(Continued)

OTHER PUBLICATIONS

Johnson, Stephen, "Office Action Regarding U.S. Appl. No. 16/100,460", Oct. 19, 2018, p. 29, Published in: U.S.

(Continued)

*Primary Examiner* — Jeffrey R Jastrzab
(74) *Attorney, Agent, or Firm* — Neugeboren O'Dowd, P.C.

(57) ABSTRACT

The present invention is an ammunition magazine, preferably made of a reinforced polymer, utilizing a structurally enhancing ridge, angular guide rails and a follower made to interface with said guide rails to reduce wobble. The preferred embodiment also features a protective cover that distributes forces from the spring to more structurally sound areas of the magazine, thus reducing feed end splay, and an ammunition indication system comprised of at least one window and a noticeable marker on the follower spring. The follower and magazine casing are also designed to interface to prevent the follower from popping out of the feed end and the floor plate of the magazine utilizes a locking plate and sliding relationship between the floor plate, locking plate and magazine to secure the floor plate onto the magazine casing. The cover features built in tools for, among other things, unloading and disassembling the magazine.

20 Claims, 16 Drawing Sheets

Related U.S. Application Data continuation of application No. 14/632,804, filed on Feb. 26, 2015, now Pat. No. 9,746,264, which is a continuation of application No. 14/461,229, filed on Aug. 15, 2014, now Pat. No. 8,991,086, which is a continuation of application No. 14/098,467, filed on Dec. 5, 2013, now Pat. No. 8,839,543, which is a continuation of application No. 13/307,431, filed on Nov. 30, 2011, now Pat. No. 8,635,796.

(51) Int. Cl.

| | |
|---|---|
| ***F41A 9/65*** | (2006.01) |
| ***F41A 9/69*** | (2006.01) |
| ***F41A 9/70*** | (2006.01) |
| ***F41A 9/83*** | (2006.01) |

(56) References Cited

U.S. PATENT DOCUMENTS

| | | | | |
|---|---|---|---|---|
| 3,443,334 | A * | 5/1969 | Ardolino | F41A 9/70 42/50 |
| 3,453,762 | A * | 7/1969 | Fremont | F41A 9/67 206/3 |
| 3,636,647 | A * | 1/1972 | Goldin | F41A 9/69 42/50 |
| 3,906,652 | A | 9/1975 | Evans | |
| 4,127,954 | A | 12/1978 | Hausmann | |
| 4,139,959 | A | 2/1979 | Howard et al. | |
| 4,226,041 | A * | 10/1980 | Goodworth | F42B 39/02 42/50 |
| 4,314,419 | A | 2/1982 | Koon, Jr. | |
| 4,408,409 | A * | 10/1983 | Arias | F41A 9/69 42/50 |
| 4,442,962 | A * | 4/1984 | Musgrave | F41A 9/63 224/101 |
| 4,580,364 | A | 4/1986 | Vyprachticky | |
| 4,589,218 | A | 5/1986 | Teppa | |
| 4,672,760 | A | 6/1987 | Chesnut et al. | |
| 5,113,605 | A | 5/1992 | Kim | |
| 5,149,897 | A | 9/1992 | Howard | |
| 5,309,660 | A | 5/1994 | Blackamore | |
| 5,345,660 | A | 9/1994 | Howard | |
| 5,956,878 | A | 9/1999 | Yang | |
| 6,481,136 | B1 | 11/2002 | Fitzpartick | |
| 7,093,386 | B1 | 8/2006 | Vieweg | |
| 7,533,483 | B1 | 5/2009 | Alzamora et al. | |
| 7,908,780 | B2 | 3/2011 | Fitzpatrick et al. | |
| 8,069,601 | B1 | 12/2011 | Fitzpatrick et al. | |
| 8,225,541 | B2 | 7/2012 | Bigley et al. | |
| 8,635,796 | B2 | 1/2014 | Fitzpatrick et al. | |
| 8,839,543 | B2 | 9/2014 | Fitzpatrick et al. | |
| 8,991,086 | B2 | 3/2015 | Fitzpatrick et al. | |
| 9,746,264 | B2 | 8/2017 | Fitzpatrick et al. | |
| 10,072,903 | B2 | 9/2018 | Fitzpatrick et al. | |
| 10,393,457 | B2 | 8/2019 | Fitzpatrick et al. | |
| RE49,104 | E | 6/2022 | Fitzpatrick et al. | |
| 2003/0066227 | A1 | 4/2003 | Fitzpatrick | |
| 2005/0011097 | A1 * | 1/2005 | Freed | F41A 9/65 42/49.02 |
| 2009/0107022 | A1 | 4/2009 | Fitzpatrick et al. | |
| 2010/0101132 | A1 | 4/2010 | Jacobson | |
| 2011/0005113 | A1 | 1/2011 | Fitzpatrick et al. | |
| 2011/0113663 | A1 | 5/2011 | Nakayama et al. | |
| 2014/0215878 | A1 | 8/2014 | Fitzpatrick et al. | |
| 2015/0184983 | A1 * | 7/2015 | Pink | F41H 11/08 206/494 |
| 2017/0328659 | A1 | 11/2017 | Fitzpatrick et al. | |
| 2018/0347928 | A1 | 12/2018 | Fitzpatrick et al. | |

FOREIGN PATENT DOCUMENTS

| | | | |
|---|---|---|---|
| EP | 0608072 | A1 | 7/1994 |
| EP | 2208957 | A2 | 7/2010 |
| GB | 275606 | A | 10/1927 |
| GB | 1094155 | B | 12/1960 |

OTHER PUBLICATIONS

Gruber, Stephen, "Response to Office Action Regarding U.S. Appl. No. 16/100,460", Mar. 14, 2019, p. 13, Published in: U.S.
Johnson, Stephen, "United States Office Action Re U.S. Appl. No. 14/632,804", Feb. 2, 2017, p. 8, Published in: U.S.
Johnson, Stephen, "United States Office Action Re U.S. Appl. No. 14/632,804", Apr. 15, 2016, p. 35, Published in: U.S.
Johnson, Stephen, "United States Office Action Re U.S. Appl. No. 14/632,804", Aug. 8, 2016, p. 10, Published in: U.S.
Gruber, Stephen S., "Response to Office Action Re U.S. Appl. No. 14/632,804", Jan. 9, 2016, p. 11, Published in: U.S.
Gruber, Stephen S., "Response to Office Action Re U.S. Appl. No. 14/632,804", May 1, 2017, p. 8, Published in: U.S.
Gruber, Stephen S., "Response to Office Action Re U.S. Appl. No. 14/632,804", Jun. 15, 2016, p. 16, Published in: U.S.
Gruber, Stephen, "Response to Office Action Regarding U.S. Appl. No. 15/661,620", Mar. 30, 2018, p. 11, Published in: U.S.
"Claims Chart Re U.S. Pat. 3,73,686 (Moller)", , p. 24, Publisher: Prior Art Exhibit C in Civil Action No. 1:13-cv-01983-RBJ, *Magpul Industries Corp* v. *Brookshire Tool & Mfg Company, Inc. dba Promag Industries*, Published in: U.S.
Johnson, Stephen, "Office Action re U.S. Appl. No. 14/098,467", Mar. 21, 2014, p. 42, Published in: U.S.
Johnson, Stephen, "Office Action re U.S. Appl. No. 13/307,431", Apr. 5, 2013, p. 7, Published in: U.S.
Johnson, Stephen, "Office Action re U.S. Appl. No. 14/098,467", Apr. 8, 2014, p. 5, Published in: U.S.
Johnson, Stephen, "Office Action re U.S. Appl. No. 14/461,229", Oct. 9, 2014, p. 27, Published in: U.S.
Johnson, Stephen, "Office Action re U.S. Appl. No. 13/307,431", Nov. 2, 2012, p. 8, Published in: U.S.
Johnson, Stephen, "Office Action re U.S. Appl. No. 13/307,431", Nov. 22, 2013, p. 21, Published in: U.S.
Magpul Industries, Corp., "http://www.magpul.com/catalog/images/pmag1_06.jpg", Printed Publications on www.magpul.com, Jul. 16, 2007, p. 2, Publisher: Magpul Industries Corp, Published in: U.S.
Gruber, Stephen S., "Response to Office Action re U.S. Appl. No. 14/098,467", Mar. 28, 2014, p. 15, Published in: U.S.
Gruber, Stephen S., "Response to Office Action re U.S. Appl. No. 14/098,467", Apr. 8, 2014, p. 13, Published in: U.S.
Gruber, Stephen S., "Response to Office Action re U.S. Appl. No. 13/307,431", Oct. 4, 2013, p. 22, Published in: U.S.
Gruber, Stephen S., "Response to Office Action re U.S. Appl. No. 13/307,431", Nov. 25, 2013, p. 22, Published in: U.S.
Gruber, Stephen S., "Response to Office Action re U.S. Appl. No. 14/461,229", Dec. 11, 2014, p. 13, Published in: U.S.
Dobbin, Geoffrey, "Response to Office Action re U.S. Appl. No. 13/307,431", Mar. 14, 2013, p. 10, Published in: U.S.
Steyr Mannlicher International, "Product Page for Steyr Aug. 30 Round Black Magazine", Oct. 9, 2013, p. 3, Publisher: Page downloaded from http://www.steyrarms.com/store/index.php/magazines/auto-5.html downloaded on, Published in: U.S.
Fitzpatrick, et al., "Specification for related U.S. Appl. No. 14/098,467", Dec. 5, 2013, p. 21, Published in: U.S.
Fitzpatrick, et al., "Specification for related U.S. Appl. No. 60/941,646", Jun. 1, 2007, p. 7, Published in: U.S.
Gruber, Stephen, Response to office action issued in U.S. Appl. No. 17/017,408, filed Jan. 18, 2022, p. 22.
Jastrzab, Jeffrey R., Office action issued in U.S. Appl. No. 17/839,327, filed Jan. 8, 2024, p. 56.
Jastrzab, Jeffrey R., Office action issued in U.S. Appl. No. 17/017,408, filed Aug. 17, 2021, p. 97.
U.S. Appl. No. 17/839,327, filed Jun. 13, 2022, First named inventor: Fitzpatrick. Office Action dated Jul. 17, 2024. 18 pages.

(56) References Cited

OTHER PUBLICATIONS

Nash, William B., "*Magpul Industries Corp.*, v. *Brookshire Tool and Mfg. Company, Inc. DBA Promag Industries* Civil Action No. 1:13-CV-01983-", "First Amended Answer, Affirmative Defenses and Counterclaims", Feb. 18, 2014, p. 19, Published in: U.S.
Nash, William B., "Civil Action No. 1:13-CV-01983-RBJ; *Magpul Industries Corp.* v. *Brookshire Tool and Mfg Company, Inc. DBA Promag Industri"*, "Second Amended Answer, Affirmative Defenses, and Counterclaims", Mar. 11, 2014, p. 19, Published in: U.S.
"Claims Chart Re U.S. Pat. No. 7,533,483 (Alzamora)", "Prior Art Exhibit A in Civil Action No. 1:13-cv-01983-RBJ, *Magpul Industries Corp* v. *Brookshire Tool & Mfg Company, Inc"*, , p. 34, Published in: U.S.
Adams, W. Thad, "Re: *Magpul Industries Corp.* v. *Big Rock Sports, LLC; Magpul Industries Corp.* v. *Plinker Arms, LLC"*, Sep. 9, 2013, p. 8, Published in: U.S.
"Claims Chart Re U.S. Pat. No. 3,377,732 (Bivens)", "Prior Art Exhibit K in Civil Action No. 1:13-cv-01983-RBJ, *Magpul Industries Corp* v. *Brookshire Tool & Mfg Company, Inc. dba Promag Industries"*, , p. 26, Published in: U.S.
"Claims Chart Re U.S. Pat. No. 7,497,044 (Cammenga)", "Prior Art Exhibit F in Civil Action No. 1:13-cv-01983-RBJ, *Magpul Industries Corp* v. *Brookshire Tool & Mfg Company, Inc. dba Promag Industries"*, , p. 22, Published in: U.S.
Long, Alexander S., "Report of the conduct of Geoffrey E. Dobbin pursuant to 37 C.F.R. 11.803", Dec. 13, 2013, p. 8, Published in: U.S.
"Document Production for Civil Action *Magpul Industries Corp.* v. *Brookshire Tool & Mfg Company, Inc. dba Promag Industries"*, , p. 92 Published in: U.S.
"Claims Chart Re U.S. Pat. No. 3,906,652 (Evans)", "Prior Art Exhibit L in Civil Action No. 1:13-cv-01983-RBJ, *Magpul Industries Corp* v. *Brookshire Tool & Mfg Company, Inc. dba Promag Industries"*, , p. 17 Published in: U.S.
"Claims Chart Re U.S. Pat. No. 3,465,463 (Grandy)", "Prior Art Exhibit H in Civil Action No. 1:13-cv-01983-RBJ, *Magpul Industries Corp* v. *Brookshire Tool & Mfg Company, Inc. dba Promag Industries"*, , p. 18 Published in: U.S.
"Claims Chart Re U.S. Pat. No. 2,081,235 (Hillyard)", "Prior Art Exhibit E in Civil Action No. 1:13-cv-01983-RBJ, *Magpul Industries Corp* v. *Brookshire Tool & Mfg Company, Inc. dba Promag Industries"*, , p. 21 Published in: U.S.
Adam Webber—hkparts.net, "Product page for G36 30 Round Mag", Oct. 9, 2013, p. 2, Publisher: page downloaded from www.hkparts.net/shop/pc/G36-30-Round-Mag-13p624.htm downloaded on, Published in: U.S.
Johnson, Stephen, "United States Offrice Action Re U.S. Appl. No. 15/661,620", Nov. 2, 2017, p. 54, Published in: U.S.
"Claims Chart Re U.S. Pat. No. 2,783,570 (Kunz)", "Prior Art Exhibit G in Civil Action No. 1:13-cv-01983-RBJ, *Magpul Industries Corp* v. *Brookshire Tool & Mfg Company, Inc. dba Promag Industries"*, , p. 15 Published in: U.S.
Tactical Testing & Evaluation, LLC, "Magpul PMAG","Downloaded from http://ttellc.net/pmag.htm", Oct. 14, 2007, p. 2 Published in: U.S.
"Claims Chart Re U.S. Pat. No. 3,73,686 (Moller)", , p. 24, Publisher: Prior Art Exhibit C in Civil Action No. 1:13-cv-01983-RBJ, *Magpul Industries Corp* v. *Brookshire Tool & Mfg Company, Inc. dba Promag Industries*, Published in: U.S.
"Claims Chart Re U.S. Pat. No. 3,110,122 (Musgrave)", "Prior Art Exhibit I in Civil Action No. 1:13-cv-01983-RBJ, *Magpul Industries Corp* v. *Brookshire Tool & Mfg Company, Inc. dba Promag Industries"*, , p. 20, Published in: U.S.
"Claims Chart Re U.S. Pat. No. 3,226,869 (Musgrave)", "Prior Art Exhibit D in Civil Action No. 1:13-cv-01983-RBJ, *Magpul Industries Corp* v. *Brookshire Tool & Mfg Company, Inc. dba Promag Industries"*, , p. 22, Published in: U.S.
Magpul Industries, Corp., "http://www.magpul.com/catalog/images/pmag1_02jpg", "Printed Publications on www.magpul.com", Jul. 16, 2007, p. 2 Publisher: Magpul Industries Corp, Published in: U.S.
Magpul Industries, Corp., "http://www.magpul.com/catalog/images/pmag1_03.jpg", "Printed Publications on www.magpul.com", Dec. 2, 2007, p. 2 Publisher: Magpul Industries Corp., Published in: U.S.
Magpul Industries, Corp., "http://www.magpul.com/catalog/images/pmag1_04.jpg", "Printed Publications on www.magpul.com", Dec. 2, 2007, p. 2 Publisher: Magpul Industries Corp., Published in: U.S.
Magpul Industries, Corp., "http://www.magpul.com/catalog/images/pmag1_05.jpg", "Printed Publication on www.magpul.com", Jul. 16, 2007, p. 2 Publisher: Magpul Industries Corp., Published in: U.S.
Magpul Industries, Corp., "The sale and/or offer for sale of the Magpul PMAG", Apr. 28, 2007, p. 6 Published in: U.S.
Nash, William B., "ProMag's Invalidity Contentions", Civil Action No. 1:13-cv-01983-RBJ, *Magpul Industries Corp* v. *Brookshire Tool & Mfg Company, Inc. dba Promag Industries*, Apr. 28, 2014, p. 11 Published in: U.S.
Nash, William B., "Promag's Invalidity Contentions for U.S. Pat. No. D. 614,719S", "Civil Action No. 1:13-cv-01983-RBJ- *Magpul Industries Corp.*, V. *Brookshire Tool and Mfg Company, Inc. dba Promag Industries"*, May 12, 2014, p. 9 Published in: U.S.
"Claims Chart Re U.S. Pat. No. 4,589,218 (Teppa)", "Prior Art Exhibit B in Civil Action No. 1:13-cv-01983-RBJ, *Magpul Industries Corp* v. *Brookshire Tool & Mfg Company, Inc. dba Promag Industries"*, , p. 28 Published in: U.S.
"Claims Chart Re U.S. Pat. No. 5,638,626 (Westrom)", "Prior Art Exhibit J in Civil Action No. 1:13-cv-01983-RBJ, *Magpul Industries Corp* v. *Brookshire Tool & Mfg Company, Inc. dba Promag Industries"*, , p. 21 Published in: U.S.
Magpul, "Magpul Pmag Versus a Chevy Truck", "Retreived from https://www.youtube.com/watch?v=UCFXcOOb4jc", Feb. 24, 2007, p. 3, Published in: U.S.

* cited by examiner

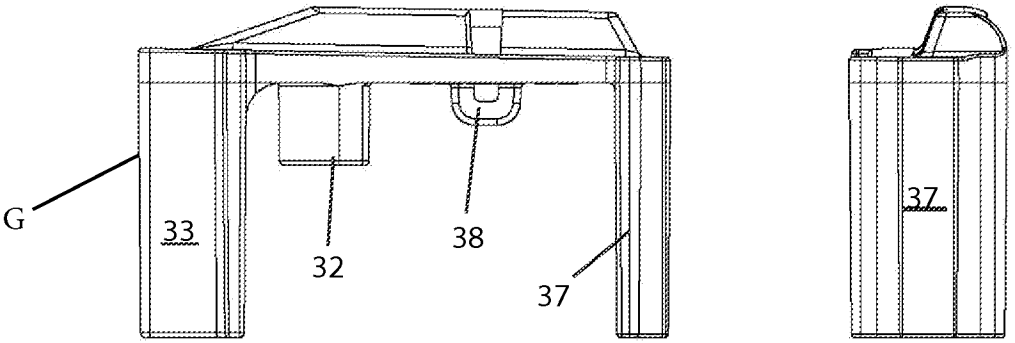
FIG. 9a
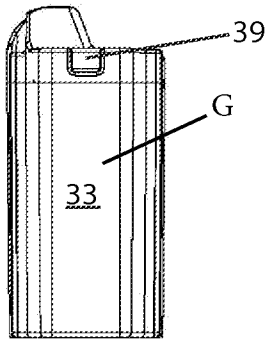
FIG. 9b
FIG. 9c
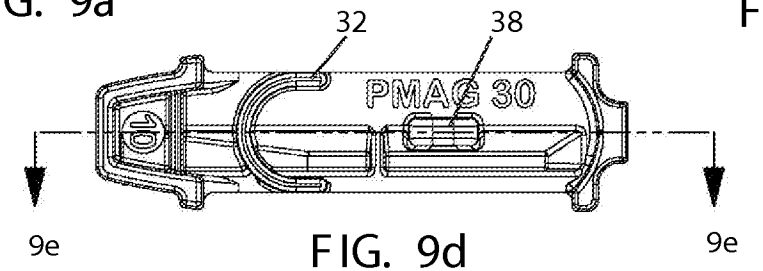
FIG. 9d
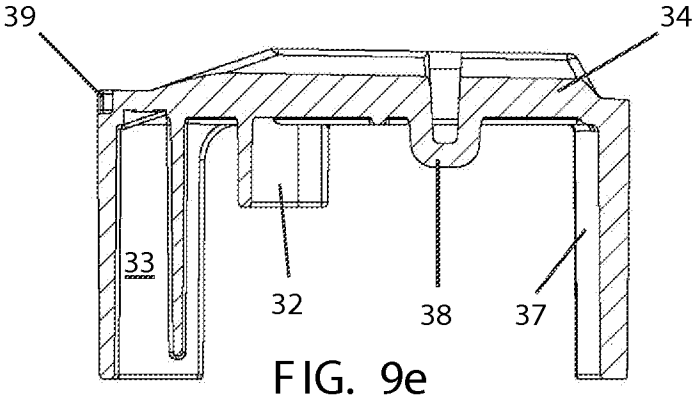
FIG. 9e
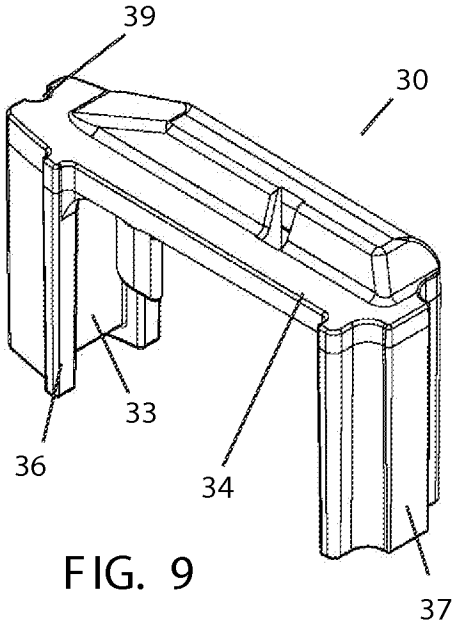
FIG. 9

AMMUNITION MAGAZINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY UNDER 35 U.S.C. § 120

The present Application for Patent is a *reissue application of U.S. patent application Ser. No. 16/100,460 entitled "Ammunition Magazine" filed Aug. 10, 2018 and issued on Aug. 27, 2019 as U.S. Pat. No. 10,393,457, which is a* Continuation of U.S. patent application Ser. No. 15/661,620 entitled "Ammunition Magazine" filed Jul. 27, 2017 and issued on Sep. 11, 2018, as U.S. Pat. No. 10,072,903, which is a Continuation of U.S. patent application Ser. No. 14/632,804 entitled "Ammunition Magazine" filed Feb. 26, 2015 and issued on Aug. 29, 2017 as U.S. Pat. No. 9,746,264, which is a Continuation of U.S. patent application Ser. No. 14/461,229 entitled "Ammunition Magazine" filed Aug. 15, 2014 and issued on Mar. 31, 2015 as U.S. Pat. No. 8,991,086, which is a Continuation-in-Part of patent application Ser. No. 14/098,467 entitled "Ammunition Magazine" filed Dec. 5, 2013 and issued on Sep. 23, 2014 as U.S. Pat. No. 8,839,543, which is a Continuation of patent application Ser. No. 13/307,431 entitled "Ammunition Magazine" filed Nov. 30, 2011 and issued on Jan. 28, 2014 as U.S. Pat. No. 8,635,796, which is a Continuation of prior filed U.S. application Ser. No. 12/354,766, filed Jan. 15, 2009 and issued on Dec. 6, 2011 as U.S. Pat. No. 8,069,601 which, in turn, is a Continuation-in-Part of prior filed U.S. application Ser. No. 11/958,274, filed on Dec. 17, 2007 issued on Mar. 22, 2011 as U.S. Pat. No. 7,908,780, which, in turn, claims priority to earlier filed U.S. Provisional Application No. 60/941,646, filed on Jun. 1, 2007. Each of these patents and applications are assigned to the assignee hereof and are hereby expressly incorporated by reference herein.

FIELD OF THE DISCLOSURE

The present invention relates to the field of firearms and more particularly relates to an improved ammunition magazine.

BACKGROUND

Ammunition magazines are well known in the art of firearms. Their basic construction is a containment shell with two open ends. One end is deemed the "floor" of the magazine and is covered by a plate while the opposite end is the "feed" end and interfaces with the weapon. Inside the volume defined by the shell and plate is a spring and follower assembly. When ammunition is loaded into the magazine, the ammunition pushes the follower down towards the floor and thereby compresses the spring. In use, when one cartridge of ammunition is expended, the compressed spring releases and pushes the follower and associated ammunition upwards toward the feed end and the next round of ammunition is thereby readied.

Prior magazines have been manufactured in many different configurations and of different materials. Perhaps the best known in the U.S. are the AK-47 and the USGI AR15/M16 magazines. These magazines function similarly, though they are made with slight variations to interface with their host system. Of notable difference is that the AK-47 magazine has a relatively constant curvature while the AR15/M16 magazine has a less curved lower region that gradually resolves to a more linear function towards the feed end. Both use the same type of internal system. Of particular note with both, and all follower magazine systems, is that the system works well only as the follower smoothly and levelly travels the inside of the magazine. As the follower must move, there is room for the follower in all the known prior art magazines to move axially, or "wobble" and possibly jam. This is notorious in the AR15/M16 magazine style as the geometry of the magazine is inherently not uniform.

The present invention is a polymer magazine with angularly shaped guide rails to interface with the internal follower, thereby restricting axial motion of the follower. The magazine also features a load indicator and a two-piece floor plate locking system. The present invention represents a departure from the prior art in that the magazine of the present invention allows for more stable and level motion of the follower while the magazine is loaded or unloaded.

SUMMARY OF THE DISCLOSURE

In view of the foregoing disadvantages inherent in the known types of ammunition magazines, this invention provides an improved magazine. As such, the present invention's general purpose is to provide a new and improved magazine that is backwards compatible with known weapon platforms and presents a more stable follower and follower path.

To accomplish these objectives, the improved ammunition magazine comprises a plurality of lateral angularly shaped guide rails within the magazine shell and a follower that is configured to abut them. By interfacing with more internal structure, all non-advantageous linear and axial motion is inhibited and the follower is then more stable in its progress. The magazine also features a polymer construction and an ammunition load indicator system. The magazine also features a cover for storage.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6b is a side plan view of the floor and lock plates of FIG. 6a.

FIG. 6c is an alternative perspective view of the floor and lock plates of FIG. 6a.

FIG. 9 is a perspective view of the follower according to the present invention.

FIG. 9a is a side plan view of the follower of FIG. 9.

FIG. 9b is a front plan view of the follower of FIG. 9.

FIG. 9c is a rear plan view of the follower of FIG. 9.

FIG. 9d is a bottom plan view of the follower of FIG. 9.

FIG. 9e is a sectional view of the follower of FIG. 9d, taken along line 9e-9e.

DETAILED DESCRIPTION

With reference now to the drawings, the preferred embodiment of the ammunition magazine is herein described. It should be noted that the articles "a", "an" and "the", as used in this specification, include plural referents unless the content clearly dictates otherwise.

Figure 1:
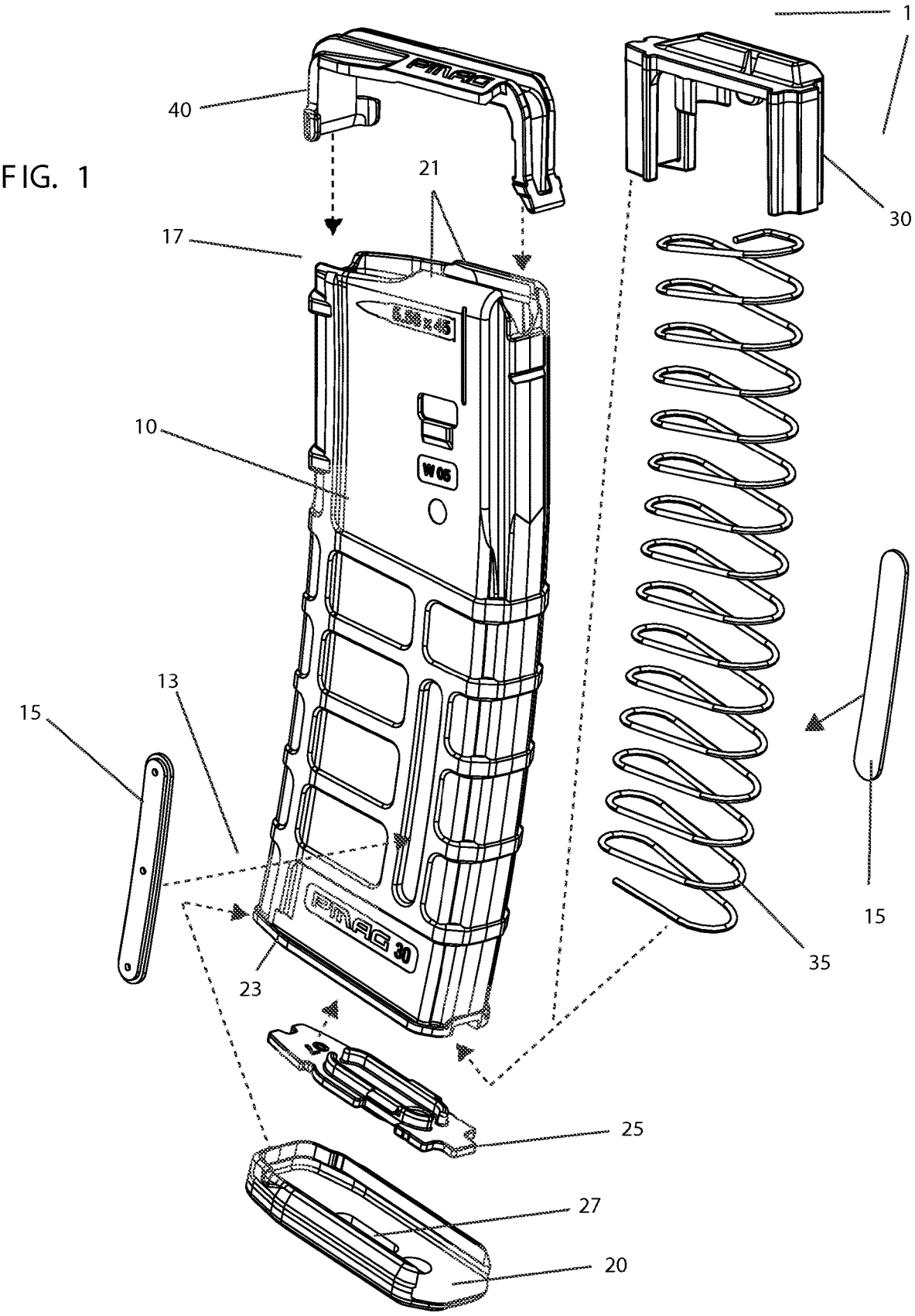
FIG. 1 is an exploded view of the magazine according to the present invention.
Figure 2:
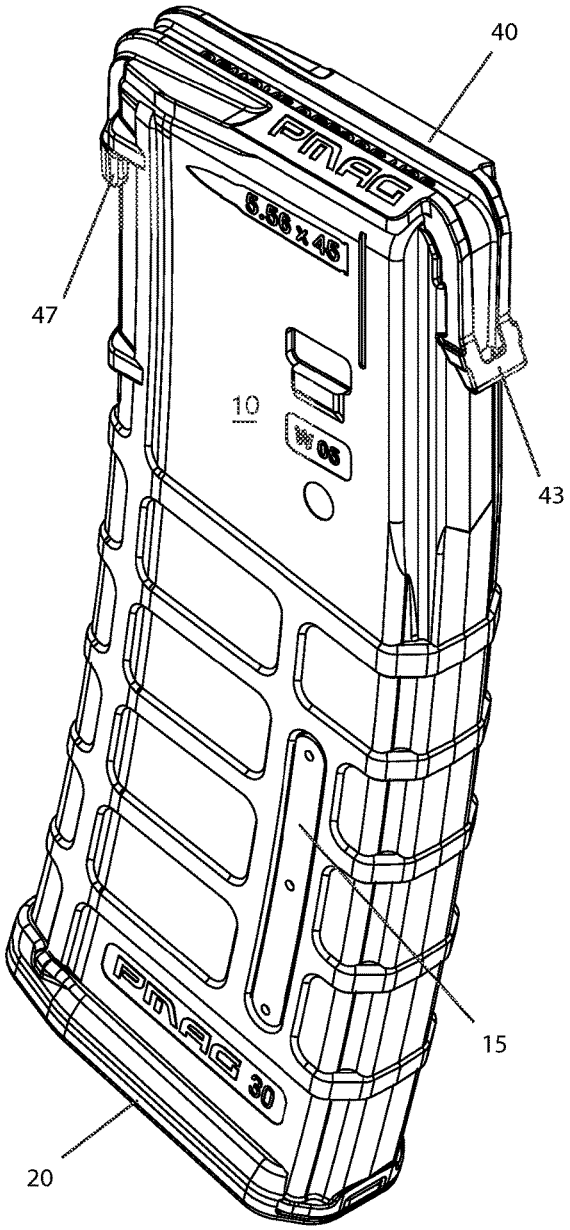
FIG. 2 is a perspective view of the assembled magazine according to the present invention.
Figure 3:
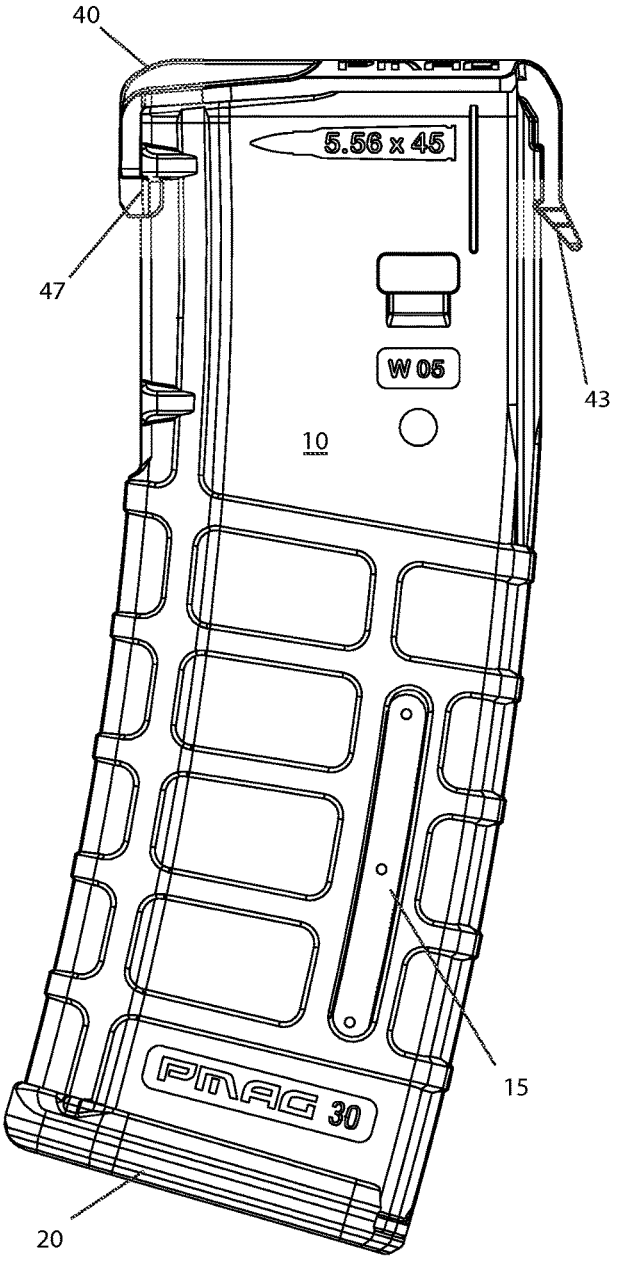
FIG. 3 is a side plan view of the magazine of FIG. 2.
Figure 5:
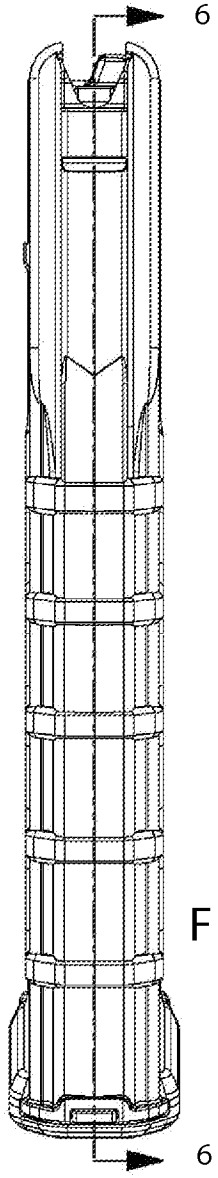
FIG. 5 is a hind plan view of the magazine of FIG. 4.
Figure 4:
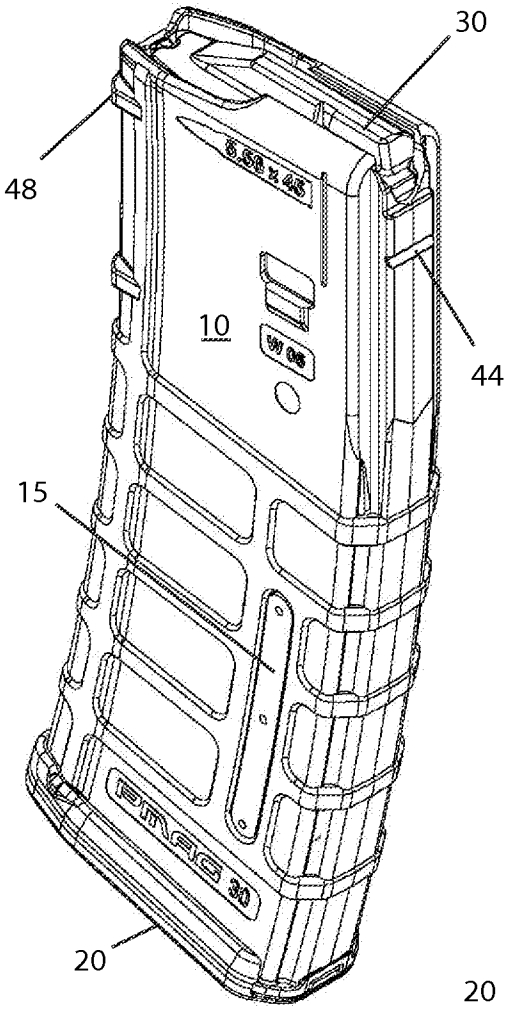
FIG. 4 is a perspective view of the magazine according to the present invention, without the impact cover.

With reference to FIG. 1, the magazine 1 generally comprises a body 10 having a floor end 13 and a feed end 17. The magazine 1, can have fore and aft sides and two lateral sides longer than the fore and aft sides. Feed lips 21 are provided at the feed end 17 to interface with a weapon and to guide cartridges into the firing chamber of said weapon. The floor end is capped with a floor plate 20 which is secured by a lock plate 25. A spring 35 rests against the lock plate 25, centered by walls 24 (see FIG. 6a), and floor plate 20 combination and provides tension to bias the follower 30 and the floor plate 20 so that the follower 30 will progress up the magazine body 10 as ammunition is used. Floor plate 20 slides over a rim 23 of the floor end 13, using a ledge to interface with the rim, and simultaneously over the lock plate 25. The floor plate 20 and lock plate 25 interface together with a tab 26 on the lock plate resting within a slot 27 of the floor plate (shown in FIGS. 6-6c), so, with the floor plate 20 holding the magazine 1 and the lock plate 25 holding the floor plate 20 laterally, as it is forced against the floor plate 20 by the spring, the floor plate 20 does not slide off the magazine 1. A protective impact cover 40 is also provided for use during storage. Magazine 1 also features two indicator windows 15 to view the spring. An indicator, which could be as simple as a colored dot or a dab of properly placed paint, is positioned on the spring and is viewable through the windows when the magazine 1 is assembled. Ideally, the windows 15 are positioned on either side of the magazine body 10 and are close enough to the floor end so that they are not obscured when the magazine 1 is inserted in a weapon's magazine well. FIGS. 2-4 provide views of the magazine 1 assembled, FIG. 4 without the impact cover 40.

Figure 6:
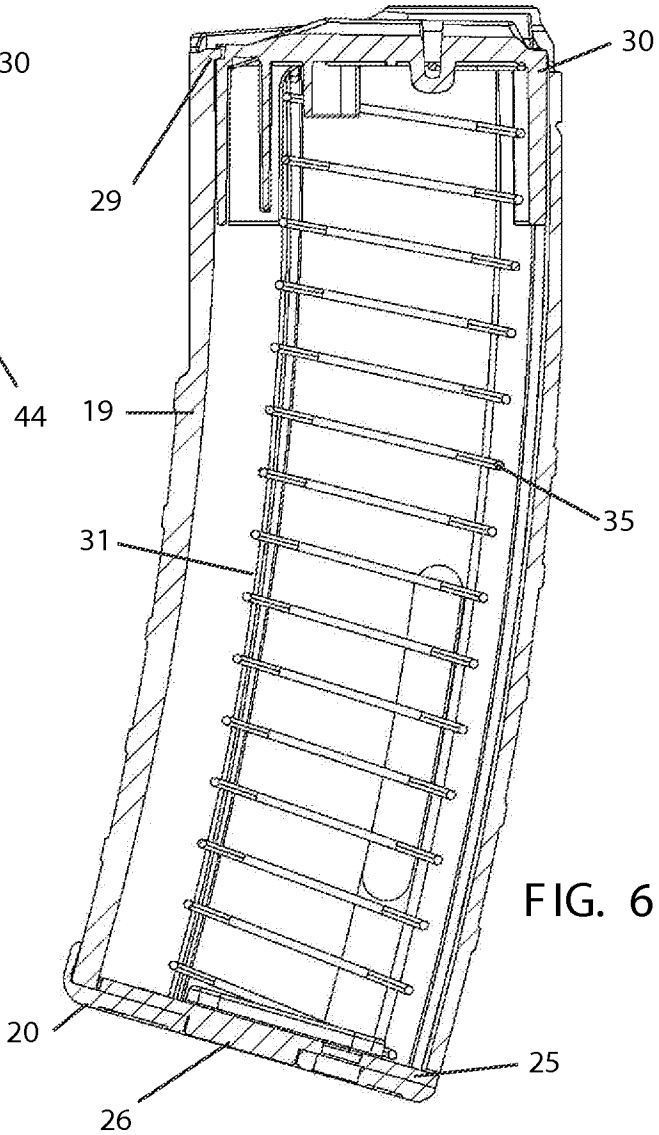
FIG. 6 is a sectional view of the magazine in FIG. 5, taken along line 6-6.
Figure 6A:
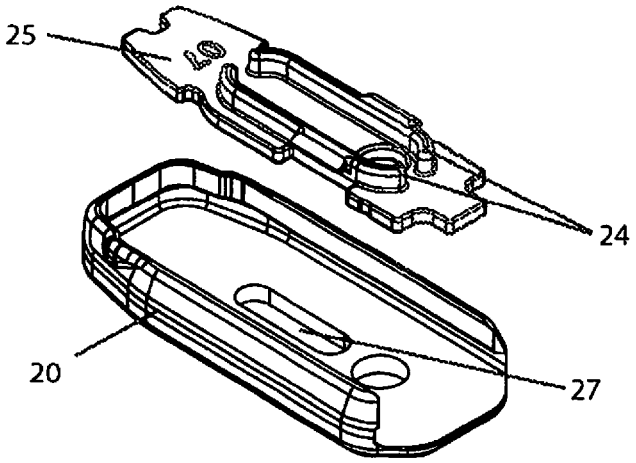
FIG. 6a is a perspective view of the floor and lock plates according to the present invention.
Figure 6B:
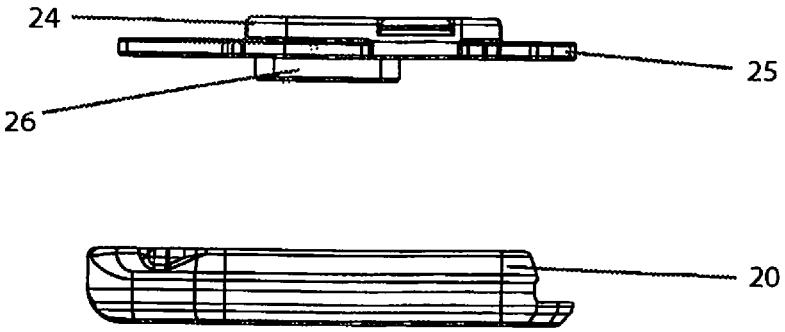
Figure 6C:
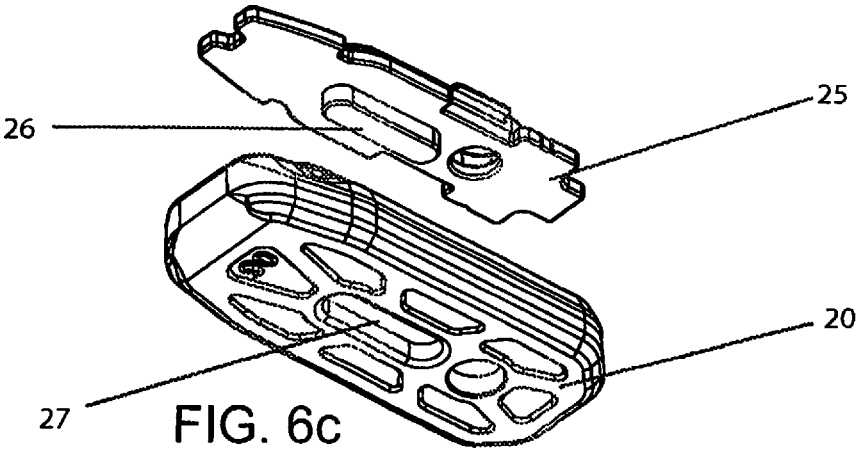
Figure 7:
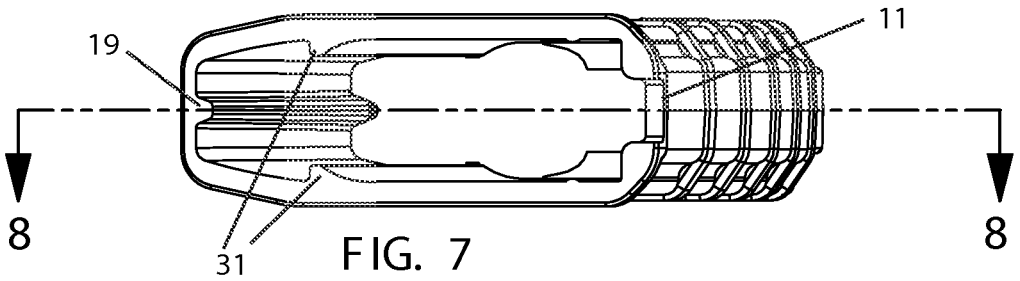
FIG. 7 is a bottom plan view of the magazine body, according to the present invention.
Figure 8:
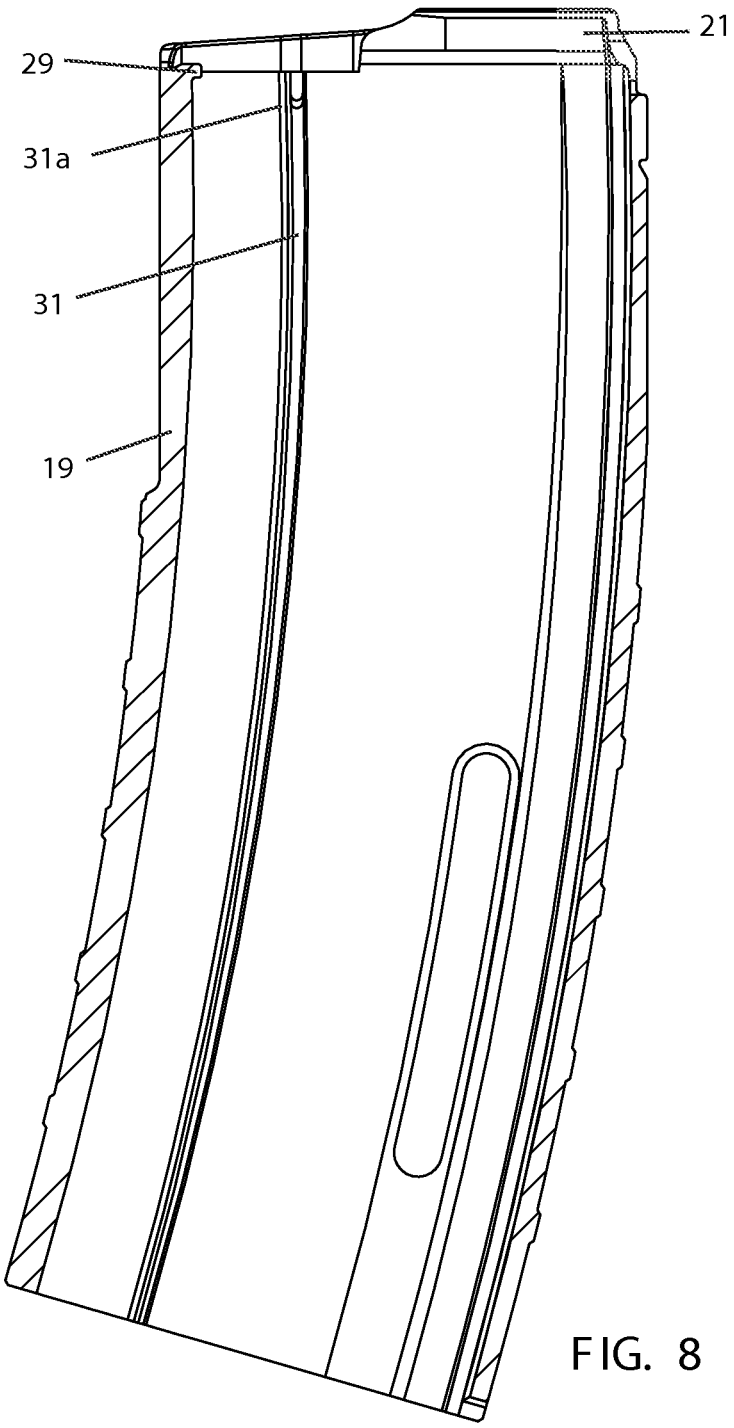
FIG. 8 is a cross-section of the magazine body of FIG. 7, taken along line 8-8 and re-orientated with the bottom down.

Inside the body 10, along the fore side of the magazine 1, is a ridge 19, shown in FIGS. 6, 7, and 8. The ridge serves three purposes. The first purpose is to provide additional stability and strength to the magazine body 10. The second purpose is to divide tips of cartridges, left from right, in their off-set stacking in the magazine. The third purpose is to provide an additional interface with the follower 30 to prevent forward linear and axial tilt. In order to accommodate stripper clips, the ridge 19 may terminate at a point significantly below the feed lips, about 0.5 inches for a .223 Remington caliber magazine, as shown in FIGS. 19-22. The factors that govern this dimension relate to cartridge size, stripper clip design and geometry, the method used to move the cartridges from the stripper clip to the magazine, and the number of rounds on the stripper clip, among other factors. The body also has two lateral guide rails 31 extending through the body 10. The guide rails 31 are flattened in front and angular towards the rear so as to present a more solid surface for the follower to abut and to guide cartridges as they travel through the magazine body 10. So as to not interfere with feeding of cartridges into the weapon, the guide rails 31 should terminate 31a at approximately a cartridge's diameter of the feed end 17 of the magazine body (as defined by the level where the rib 19 terminates with tab 29), or about ¼ inch for a .223 Remington magazine or 5/16 of an inch for a .308 Winchester caliber magazine. This is, however, only for certain embodiments, as the guide rails 31 can extend the entire length of the magazine body 10 and the magazine will still be functional.

As shown in FIGS. 9-9e, the follower 30 has two tines, a forward tine 33 and hind tine 37. Both tines are elongated and extending from platform 34. The forward tine 33 presses against the ridge 19 and prevents axial movement, particularly those movements caused by the simple act of firing the weapon, which would push the rear of the ammunition (and the follower 30) down. The hind tine 37 fits into trough 11 (FIG. 7) to prevent lateral movement. The extension of the tines greatly inhibits axial and lateral movement as the extension increases contact with the magazine body and provides more counter-torque when forces would cause such movement. The follower also has two lateral arms 36 that fit alongside of the guide rails 31 to further inhibit rotation. The follower 30 interfaces with spring 35 by attachment of the spring 35 to loop 38 and retention of the spring 35 by retaining wall 32. In some embodiments, the hind tine 37 can be excluded and the interaction of the lateral arms 36 and the guide rails 31 can be a primary inhibitor of rotation of the follower. In other embodiments, the one or more tines 33, 37 can be split via a vertical separation or gap (G).

At the top of ridge 19 is a slight tab 29 (FIGS. 6 and 8) that protrudes towards the interior of the magazine 1. Tab 29 serves as a block to prevent the follower 30 from exiting the feed end 17 of the magazine 1. It interfaces with a detent 39 provided in the follower 30 (FIGS. 9, 9b, and 9e). In the embodiment shown in FIGS. 19-22, the tab 29 is, of course, lower in relation to the feed lips. The follower 30 then, as shown in FIGS. 23-31 has a chamfered groove 90 so as to allow the follower 30 to still be blocked, but in a manner that allows it to fully rise in relation to the magazine. The groove 90 also allows further interface to reduce disadvantageous tilt in the follower. In an embodiment, the lock plate 25 may also feature a ridge 96 to interface with the bottom of the follower 30 when the magazine is fully loaded, so as to support the follower 30 and round stack and reduce spring fatigue, as shown in FIGS. 19-22.

In an embodiment, the magazine body is comprised of a reinforced thermoplastic polymer selected to resist damage from use (e.g., the ejection of a magazine which causes the magazine to impact a hard surface, which may occur during a speed reload). However, other polymers may be used and the magazines may be made in any color or opacity (which can reduce or eliminate the need for a magazine level indicator). Some polymers may be used without reinforcement. Various reinforcement materials, such as glass, carbon (e.g., carbon fiber or carbon nanotubes), minerals, or metals (e.g., steel, titanium, aluminum, etc.) may also be used to reinforce the magazine. Likewise, the magazine body may be made of other materials having suitable strength and durability, such as titanium, ceramics, laminates, amorphous metals, etc. The follower is preferred to be made of polyoxymethylene, or acetal resin, available commercially from DuPont under the trade name DELRIN, though other materials are suitable, just not preferred.

The magazine 1 is structured to increase its structural integrity. To that end, fore ridge 19 provides added durability to the magazine. Protective cover 40 also provides reinforcement during storage, as pressures from the stored ammunition and spring 35 would normally force the feed lips 21 of the magazine 1 apart. Protective cover 40, shown in FIGS. 10-10 e, having a platform between two ends of the protective cover 50, interfaces with geometry, namely notch 44 and hinge base 48, on the magazine body 10 with latch 43 and cover hinge 47 (FIGS. 2, 3 and 4), and forces the ammunition downward with an underside spacer 45, thereby absorbing and distributing the forces that would normally be applied to the feed lips 21 in a more advantageous manner. Geometry/notch 92 may be added to the magazine to allow the cover to fasten on the bottom of the magazine for storage as well (FIGS. 13-18). A double notch 94 may be utilized (FIG. 17) as this geometry can benefit the molding process.

Figure 10C:
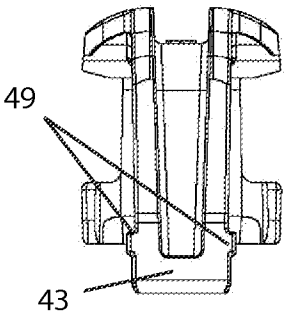
FIG. 10c is a rear plan view of the impact cover of FIG. 10.
Figure 10A:
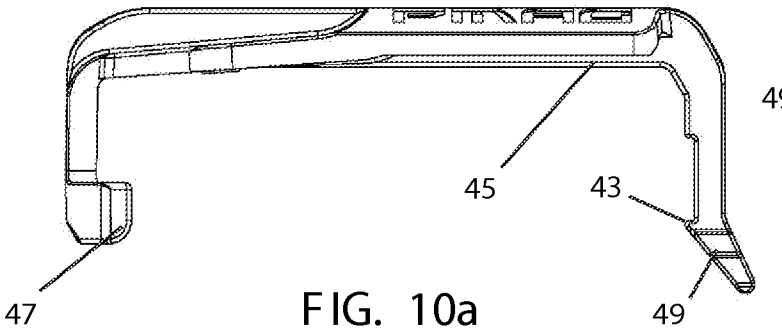
FIG. 10a is a side plan view of the impact cover of FIG. 10.
Figure 10D:
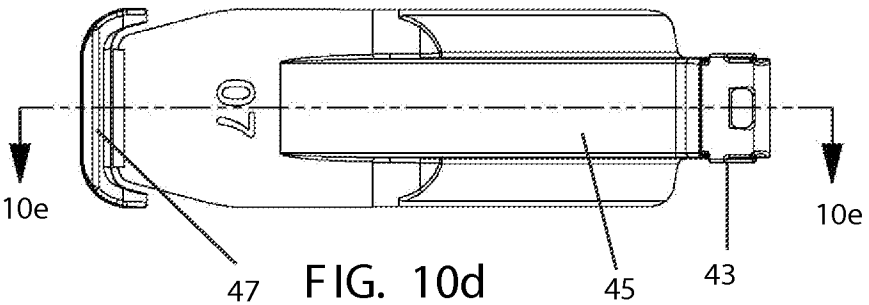
FIG. 10d is a bottom plan view of the impact cover of FIG. 10.
Figure 10E:
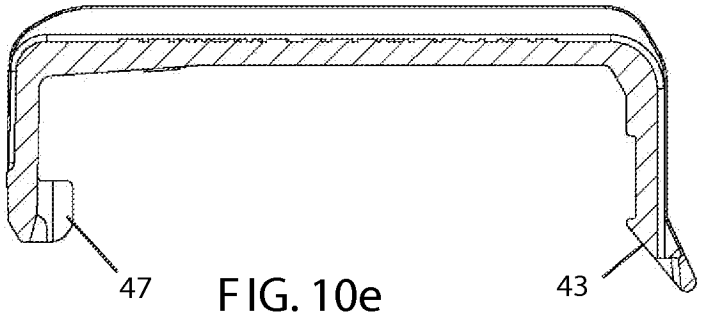
FIG. 10e is a sectional view of the impact cover of FIG. 10d, taken along line 10e-10e.
Figure 10B:
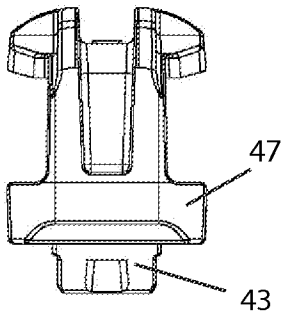
FIG. 10b is a front plan view of the impact cover of FIG. 10.
Figure 10:
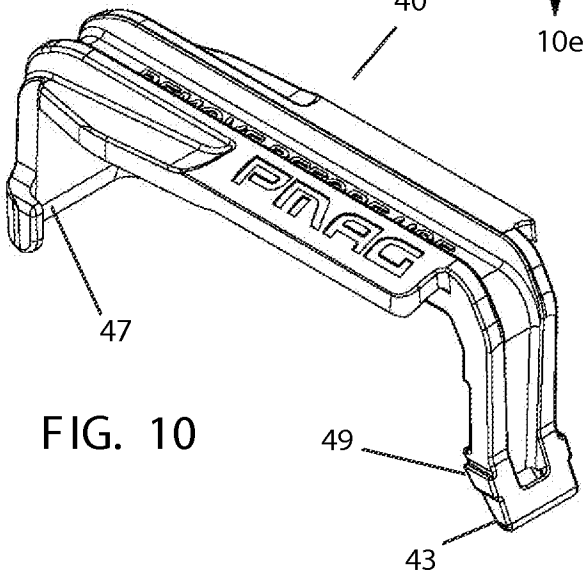
FIG. 10 is a perspective view of the impact cover according to the present invention.
Figure 11C:
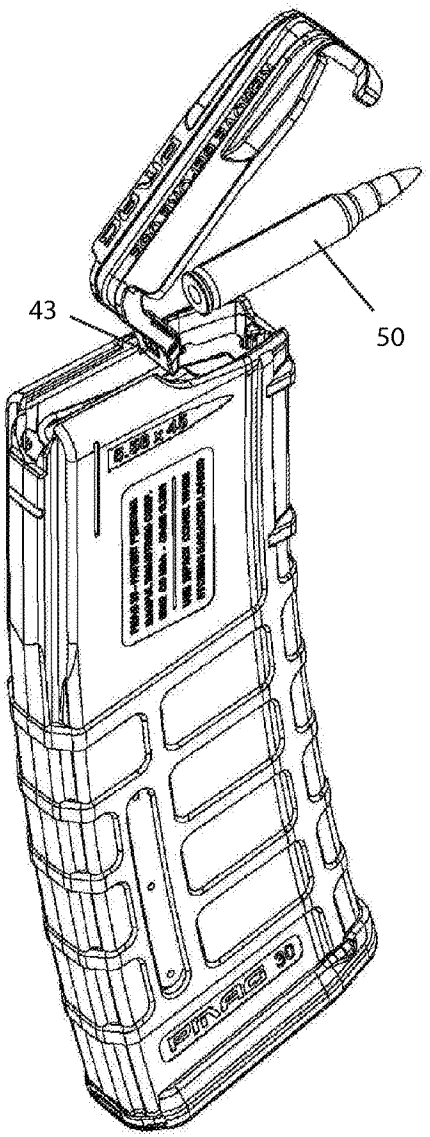
FIGS. 11a-11c are successive plan views showing use of the impact cover as a magazine unloading tool.
Figure 11B:
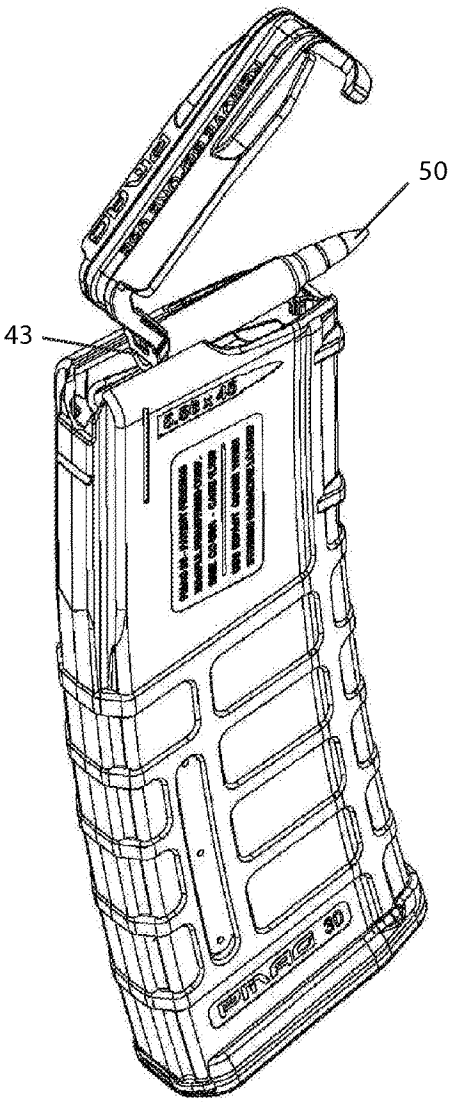
Figure 11A:
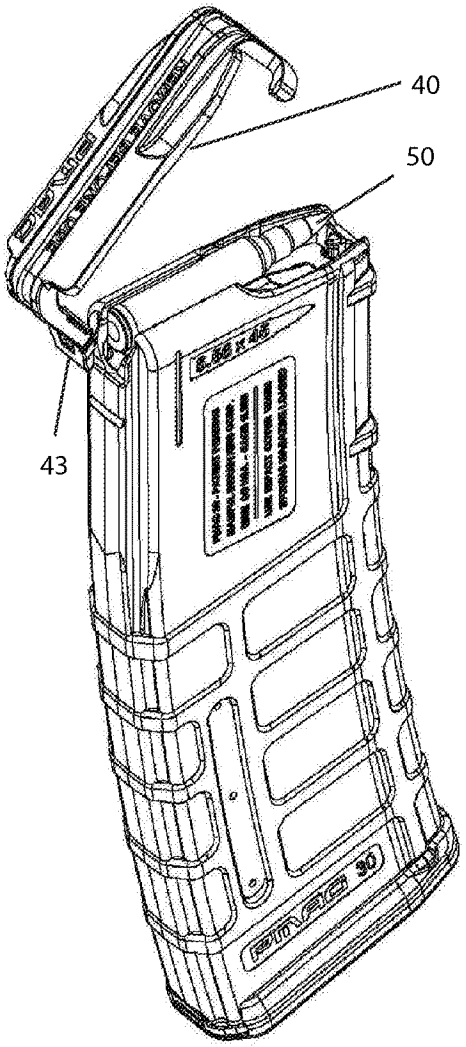
Figure 12C:
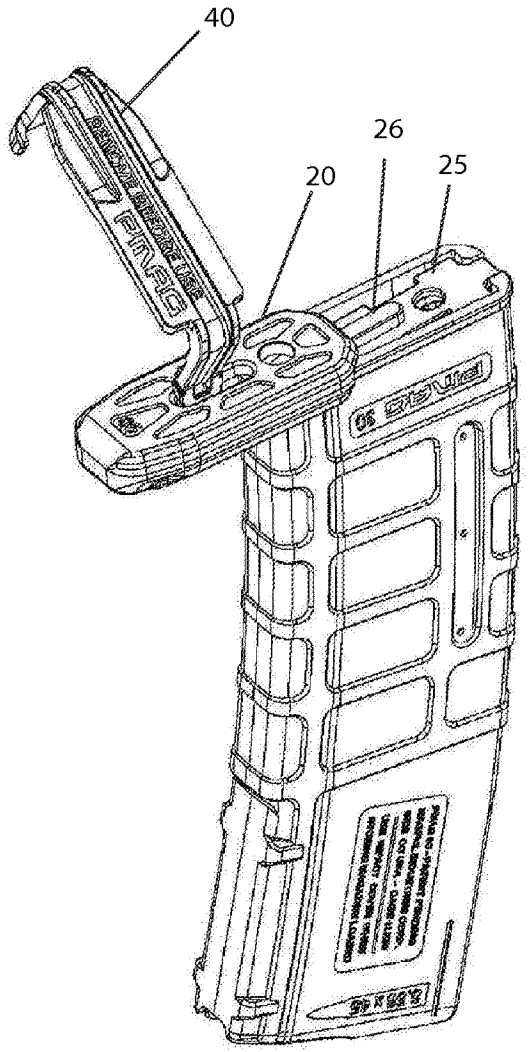
FIGS. 12a-12c are successive plan views showing use of the impact cover to disassemble the magazine.
Figure 12B:
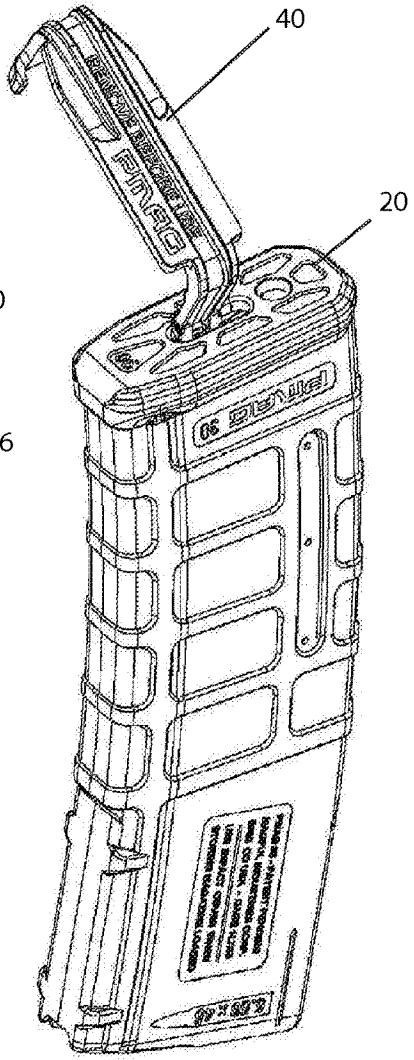
Figure 12A:
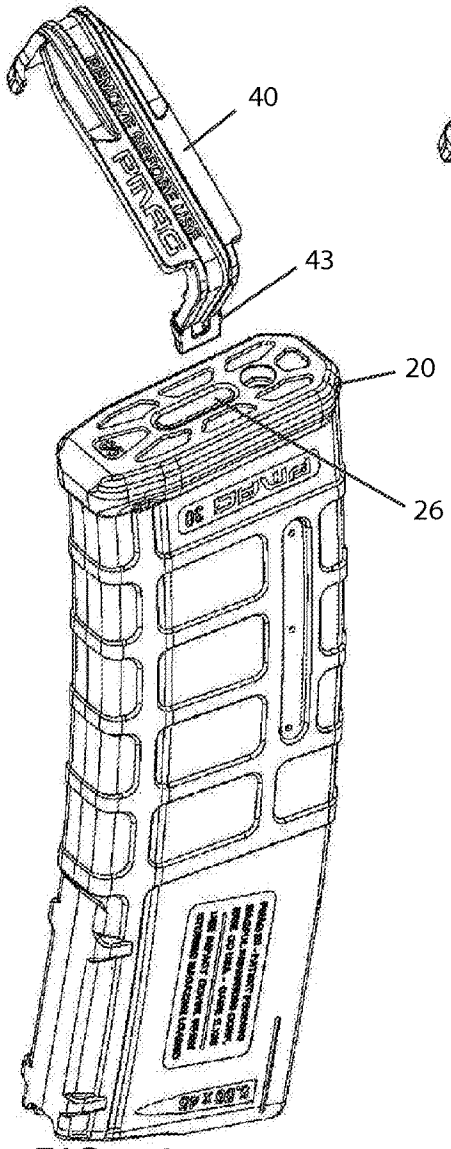
Figure 14:
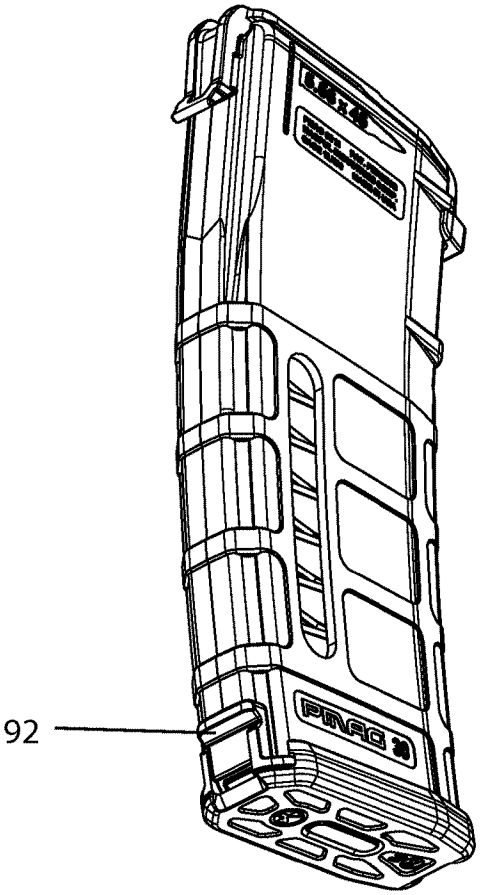
FIG. 14 is a rear perspective view of the magazine of FIG. 13.
Figure 15:
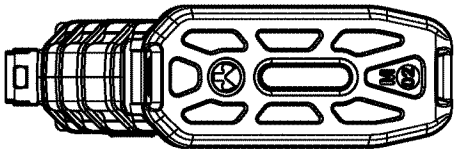
FIG. 15 is a bottom plan view of the magazine of FIG. 13.
Figure 13:
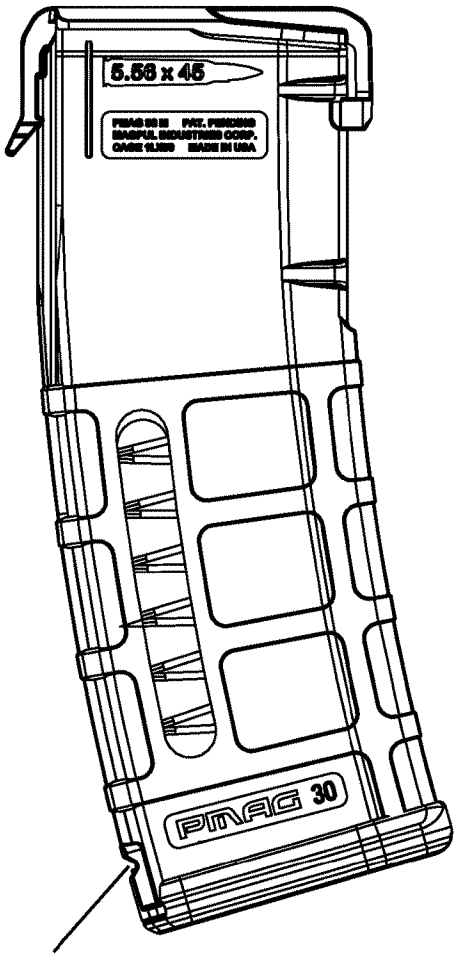
FIG. 13 is a side plan view of an alternate embodiment of the magazine according to the present invention.
Figure 17:
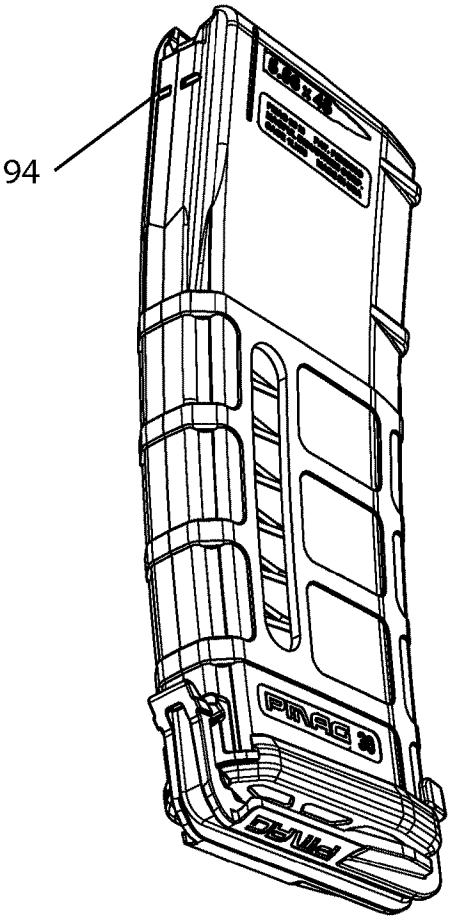
FIG. 17 is a rear perspective view of the magazine of FIG. 16.
Figure 18:
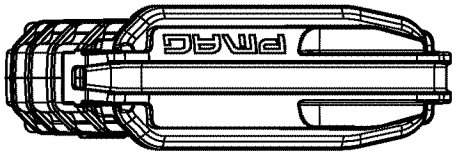
FIG. 18 is a bottom plan view of the magazine of FIG. 16.
Figure 16:
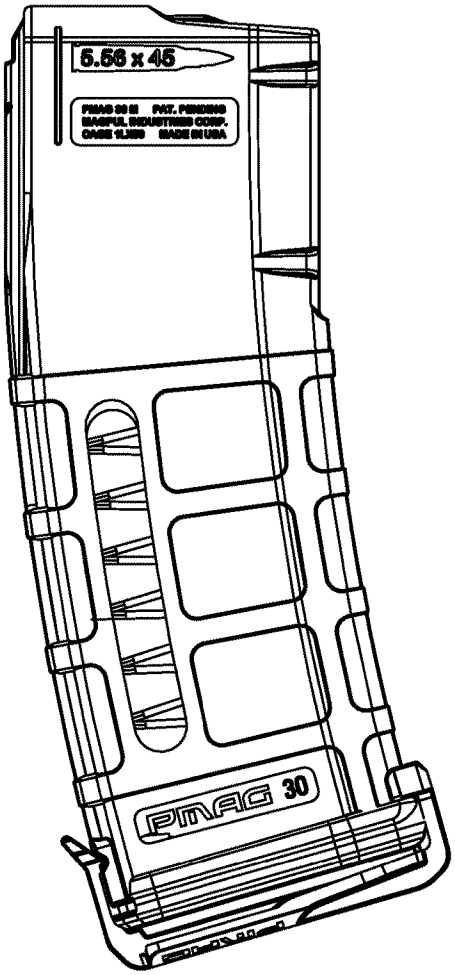
FIG. 16 is a side plan view of the magazine of FIG. 13, with the impact cover in a stowed position on the magazine.
Figure 20:
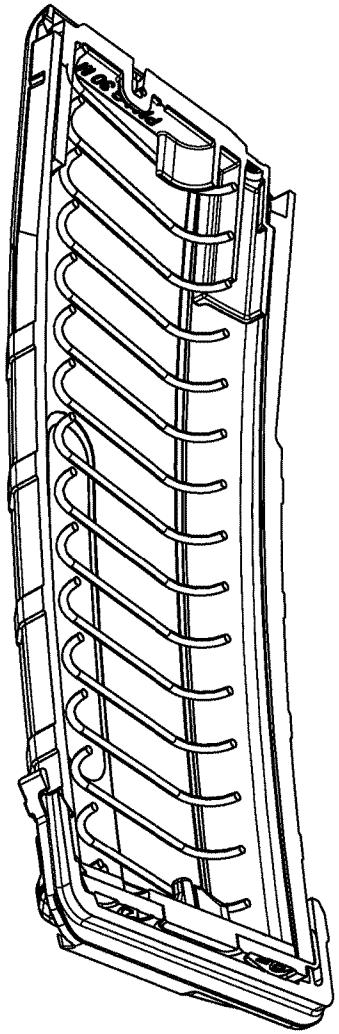
FIG. 20 is a sectional view of the magazine of FIG. 17.
Figure 19:
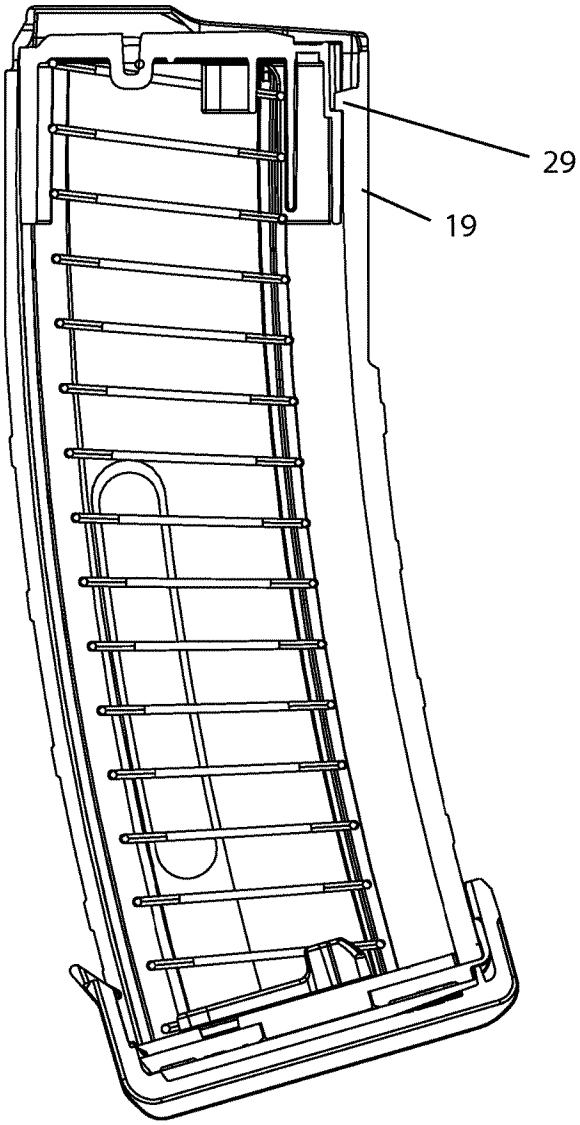
FIG. 19 is a sectional view of the magazine of FIG. 16.
Figure 22:
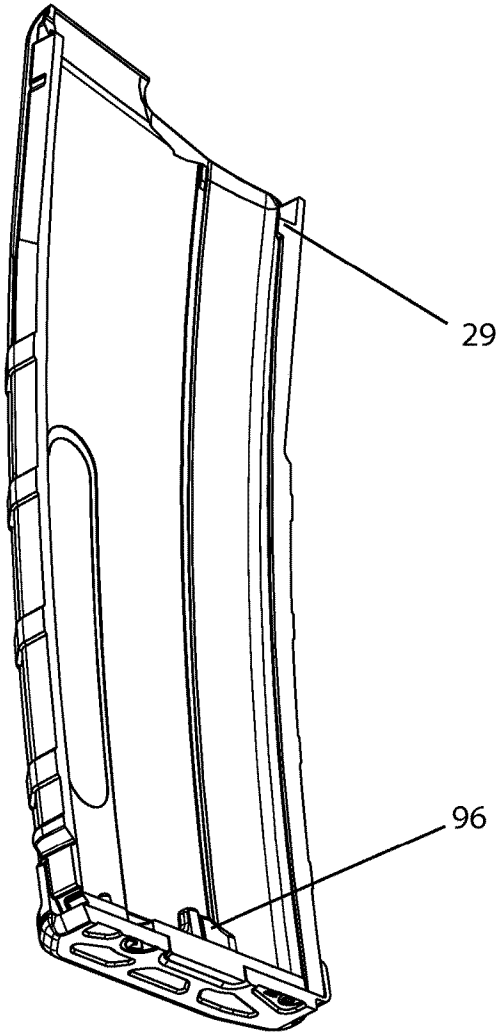
FIG. 22 is a sectional view of the magazine's external components, along the same section line as FIG. 20.
Figure 21:
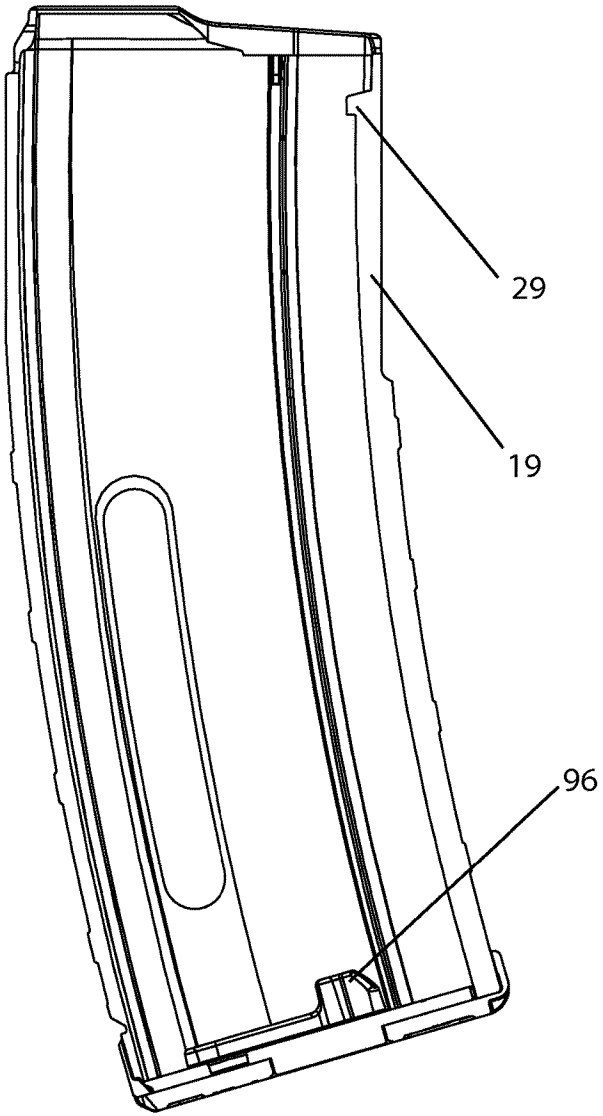
FIG. 21 is a sectional view of the magazine's external components, along the same section line as FIG. 19.
Figure 24:
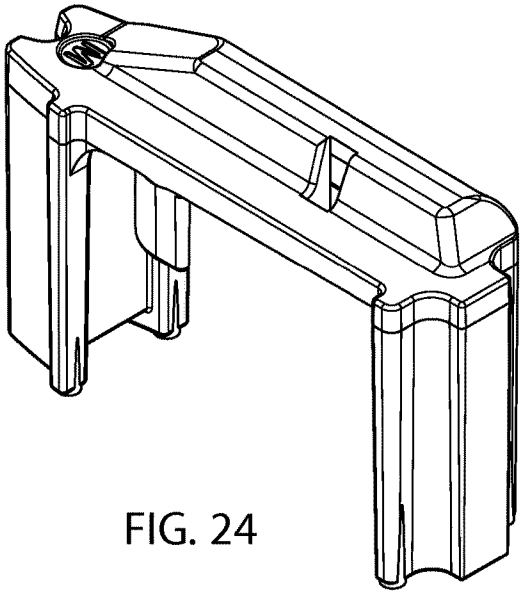
FIG. 24 is a left, rear, top perspective view of the follower of FIG. 23.
Figure 23:
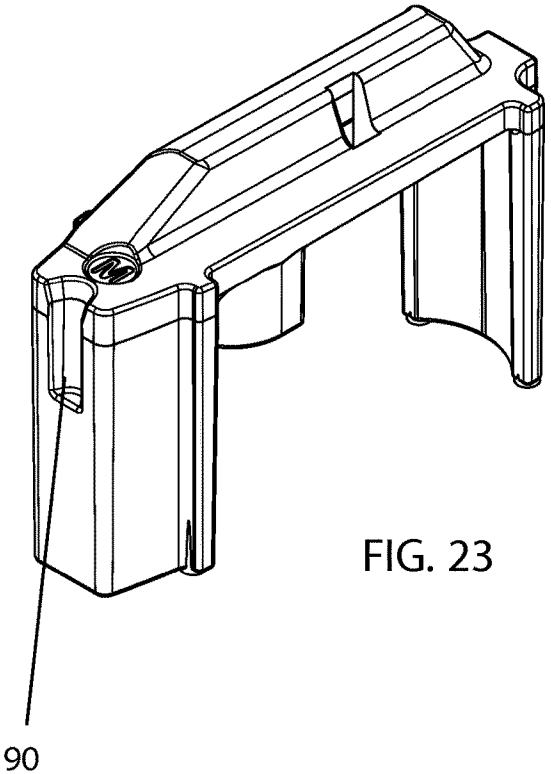
FIG. 23 is a left, front, top perspective view of a follower for the alternative magazine embodiment depicted in FIG. 13.
Figure 25:
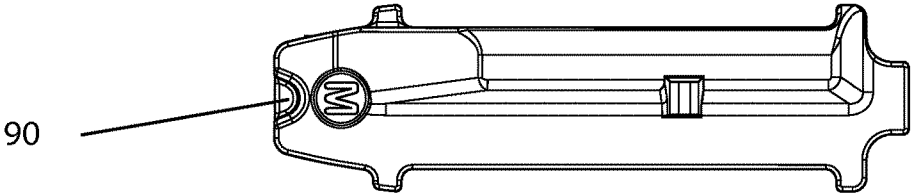
FIG. 25 is a top plan view of the follower of FIG. 23.
Figure 26:
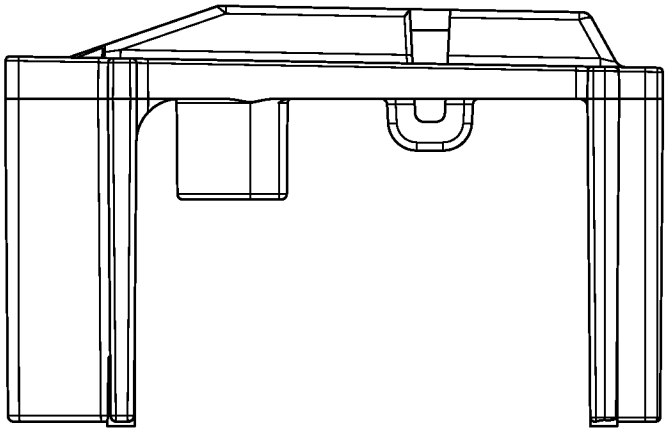
FIG. 26 a left plan view of the follower of FIG. 23.
Figure 28:
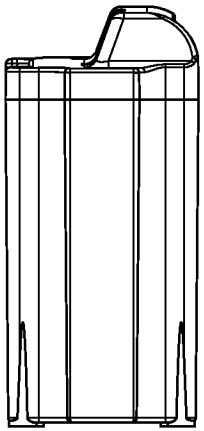
FIG. 28 is a rear plan view of the follower of FIG. 23.
Figure 27:
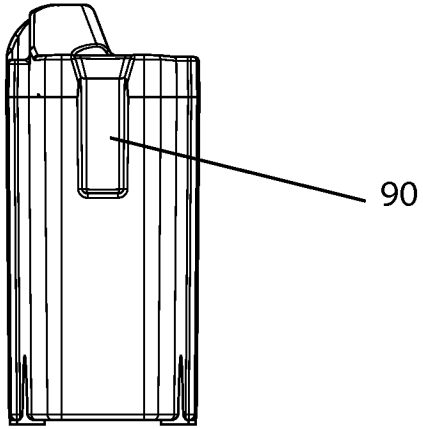
FIG. 27 is a front plan view of the follower of FIG. 23.
Figure 29:
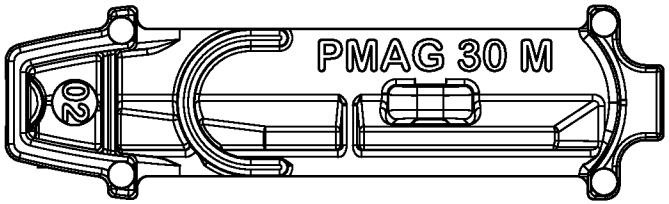
FIG. 29 is a bottom plan view of the follower of FIG. 23.
Figure 31:
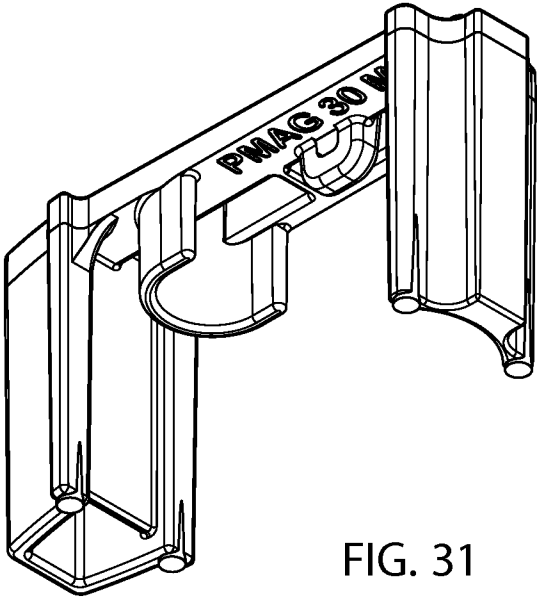
FIG. 31 is a left, rear, bottom perspective view of the follower of FIG. 23.
Figure 30:
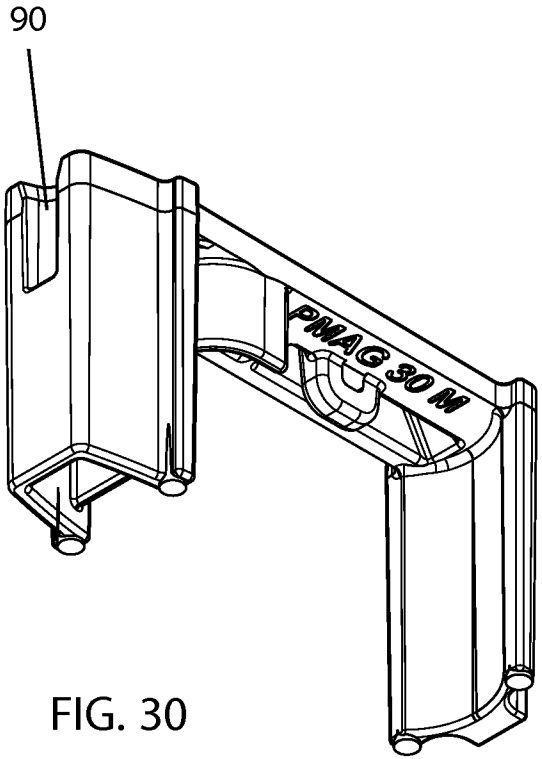
FIG. 30 is a left, front, bottom perspective view of the follower of FIG. 23.

The cover 40 also serves as a magazine tool as the cover latch 43 will fit between the feed lips 21 so as to push rounds of ammunition 50 out of the magazine 1 (FIGS. 11a-11c). It also has a specialized gauge 49 to determine if the feed lips 21 have either splayed or compressed in a manner to prevent operability of the magazine with the weapon (FIGS. 10-10e). Gauge 49 is a flared area, specially sized depending upon the size of ammunition, slightly above latch 43. The operable magazine 1 will accommodate the latch 43 between the feed lips 21, but not the gauge. If the latch 43 is unable to fit between feed lips 21, then the feed lips 21 have compressed in some manner, perhaps due to impact or compression damage, and the magazine 1 is then not fit for use. If the gauge 49 is able to fit between feed lips 21, then the feed lips 21 have splayed, perhaps due to long term storage without the impact cover 40, and the magazine 1 is not fit for use. Measurements of the gauge and latch widths will be dependent upon the type of ammunition used. Likewise, this magazine 1 is capable of being used in multiple weapon platforms, each with its own tolerances. The widths of the latch 43 and gauge 49 would be dependent upon those tolerances and different weapon platforms may be accommodated by merely fashioning a different version of the impact cover 40 for that platform, without changing the magazine as a whole. Impact cover 40 may also be used to depress the locking plate tab 26 so as to remove the floor plate 20 (FIGS. 12a-12c).

It should also be noted that magazine body 10 presents a constant internal curve, with slight straightening near the interior rear face of the feed lips only to allow interface with a weapon. As such, the follower 30 and associated ammunition travel more smoothly through the magazine body 10 with lessened round stack variation.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. An ammunition magazine comprising:

a casing with fore and aft sides and two longer lateral sides longer than the fore and aft sides and first or second open ends;

a first notch arranged adjacent to one of the first or second open ends and on the aft side of the casing;

a second notch arranged adjacent to another one of the first or second open ends and on the aft side of the casing; and a protective cover with a latch configured to flexibly couple into the first notch and the second notch, though not at the same time, thereby removably securing the protective cover to either of the first or second open ends of the casing.

2. The ammunition magazine of claim 1, wherein the protective cover further comprises a cover hinge opposite to the latch.

3. The ammunition magazine of claim 2, wherein the casing further comprises a hinge base arranged on the fore side of the casing adjacent to the one of the first or second open ends, opposite to the first notch, wherein the cover hinge is shaped to removably couple to the hinge base.

4. The ammunition magazine of claim 3, wherein the cover hinge has a concave shape that wraps around the fore side and portions of the two lateral sides of the casing.

5. The ammunition magazine of claim 1, wherein the protective cover further comprises an underside spacer that forces ammunition in the casing downward when the protective cover is removably affixed to the one of the first or second open ends of the casing.

6. The ammunition magazine of claim 1, wherein the protective cover includes a gauge arranged above a tip of the latch, wherein a width of the gauge is greater than a width of the latch, and wherein a width of undamaged feed lips of the casing is between that of the gauge and the latch.

7. An ammunition magazine comprising:

a casing with fore and aft sides and two longer lateral sides longer than the fore and aft sides and first or second open ends;

a hinge base protruding at least partially from sides of the casing adjacent one of the first or second open ends of the casing and adjacent the fore side of the casing; and a protective cover with a cover hinge, the cover hinge extending roughly perpendicularly to a platform of the protective cover, the protective cover configured to flexibly couple around the hinge base thereby removably securing the protective cover to the one of the first or second open ends of the casing.

8. The ammunition magazine of claim 7, wherein the protective cover further comprises a latch on an opposing end of the protective cover from the cover hinge.

9. The ammunition magazine of claim 8, wherein the cover hinge has a concave shape that wraps around the fore side and portions of the two lateral sides of the casing.

10. The ammunition magazine of claim [8] *13, wherein the protective cover further comprises a latch on an opposing end of the protective cover from the cover hinge; and* wherein the latch is configured to flexibly couple into the first notch and the second notch, though not at the same time, thereby removably securing the protective cover to either of the first or second open ends of the casing.

11. The ammunition magazine of claim 7, wherein the protective cover further comprises an underside spacer that forces ammunition in the casing downward when the protective cover is removably affixed to the one of the first or second open ends of the casing.

12. The ammunition magazine of claim 7, wherein the protective cover includes a gauge arranged above a tip of the latch, wherein a width of the gauge is greater than a width of the latch, and wherein a width of undamaged feed lips of the casing is between that of the gauge and the latch.

13. The ammunition magazine of claim 7, further comprising:

a first notch arranged adjacent to the one of the first or second open ends and on the aft side of the casing; and a second notch arranged adjacent to another one of the first or second open ends and on the aft side of the casing.

14. An ammunition magazine comprising:

a casing with fore and aft sides and two longer lateral sides longer than the fore and aft sides and first or second open ends;

a first notch in the casing arranged adjacent to one of the first or second open ends and on the aft side of the casing;

a hinge base protruding at least partially from sides of the casing adjacent one of the first or second open ends of the casing and adjacent the fore side of the casing; and a protective cover with a latch and a cover hinge arranged on opposing ends of the protective cover, the latch configured to flexibly couple into the first notch and the cover hinge configured to flexibly couple around the hinge base.

15. The ammunition magazine of claim 14, wherein the protective cover further comprises an underside spacer that forces ammunition in the casing downward when the protective cover is removably affixed to the one of the first or second open ends of the casing.

16. The ammunition magazine of claim 14, wherein the protective cover includes a gauge arranged above a tip of the latch, wherein a width of the gauge is greater than a width of the latch, and wherein a width of undamaged feed lips of the casing is between that of the gauge and the latch.

17. The ammunition magazine of claim 14, further comprising a second notch arranged adjacent to another one of the first or second open ends and on the aft side of the casing such that the protective cover is removably secured to the another one of the first or second open ends of the casing.

18. The ammunition magazine of claim 14, wherein the cover hinge has a concave shape that wraps around the fore side and portions of the two lateral sides of the casing.

*19. The ammunition magazine of claim 7, wherein the cover hinge has a concave shape that wraps around the fore side and portions of the two lateral sides of the casing.*

*20. The ammunition magazine of claim 13, wherein the latch is configured to flexibly couple into the first notch and the cover hinge is configured to flexibly couple around the hinge base.*

* * * * *